United States Patent [19]
Johnson et al.

[11] Patent Number: 5,510,087
[45] Date of Patent: Apr. 23, 1996

[54] TWO STAGE DOWNFLOW FLUE GAS TREATMENT CONDENSING HEAT EXCHANGER

[75] Inventors: Dennis W. Johnson, Barberton; Karl H. Schulze, North Canton, both of Ohio

[73] Assignee: The Babcock & Wilcox Company, New Orleans, La.

[21] Appl. No.: 270,968

[22] Filed: Jul. 5, 1994

[51] Int. Cl.$^6$ ........................................ F01N 3/10
[52] U.S. Cl. ........................... 422/173; 55/222; 261/108; 261/152; 422/169; 422/172; 422/198
[58] Field of Search ...................... 422/173, 169, 422/168, 172, 198, 200; 55/222, 257.1, 223, 242; 261/153, 155, 22, 108

[56] References Cited

U.S. PATENT DOCUMENTS

| | | | |
|---|---|---|---|
| 3,638,708 | 2/1972 | Farin | 159/47 WL |
| 4,431,617 | 2/1984 | Farin | 423/232 |
| 4,487,139 | 12/1984 | Warner | 110/345 |
| 4,526,112 | 2/1985 | Warner | 110/345 |
| 4,557,202 | 12/1985 | Warner | 110/216 |
| 4,577,380 | 3/1986 | Warner | 29/157.3 |
| 4,669,530 | 6/1987 | Warner | 165/1 |
| 4,681,744 | 7/1987 | Weitman | 422/173 |
| 4,705,101 | 11/1987 | Warner | 165/111 |
| 4,776,391 | 10/1988 | Warner | 165/111 |
| 4,852,344 | 8/1989 | Warner | 60/39.182 |
| 4,936,880 | 6/1990 | Sundberg | 55/222 |
| 4,999,167 | 3/1991 | Skelley et al. | 422/175 |
| 5,108,469 | 4/1992 | Christ | 55/222 X |
| 5,344,617 | 9/1994 | Johnson | 422/172 |

FOREIGN PATENT DOCUMENTS

| | | | |
|---|---|---|---|
| 0432074 | 6/1991 | European Pat. Off. | B01D 53/00 |
| 0583197 | 2/1994 | European Pat. Off. | B01D 53/54 |
| 2224193 | 10/1974 | France | B01D 50/00 |
| 2592812 | 7/1987 | France | B01D 53/54 |
| 2586204 | 2/1989 | France | B01D 53/54 |
| 3706864 | 9/1988 | Germany | B01D 53/54 |
| 6221361 | 9/1987 | Japan | F23J 15/00 |

OTHER PUBLICATIONS

"Utility Seeks to Integrate Heat Recovery Flue Gas Treatment," *Power*, May 1993.
Rochelle, Gary, "Process Alternates for Stack Gas Desulfurization with Steam Regeneration to Produce $SO_2$," EPA Symp. 1977.
B&W White Paper 1993.
B&W Proposed to James Maclaren Inc. dated Oct. 7, 1993.

*Primary Examiner*—Robert J. Warden
*Assistant Examiner*—Krisanne M. Thornton
*Attorney, Agent, or Firm*—Daniel S. Kalka; Robert J. Edwards

[57] ABSTRACT

A two-stage downflow flue gas treatment condensing heat exchanger system allows for flue gas to be passed into a two-stage housing at an upper end of the housing. The flue gas is channeled through a first stage of the housing having a first condensing heat exchanger which cools the flue gas. The flue gas is then channeled through a second stage having a second condensing heat exchanger which is located directly beneath the first stage and the first condensing heat exchanger for further cooling the flue gas. The flue gas travels in a downward direction only through the housing and exits the housing at the lower end of the housing beneath the second stage. A collection tank is located beneath the second stage of the housing for collecting liquids, condensate, particulate and reaction product.

6 Claims, 3 Drawing Sheets

TWO STAGE DOWNFLOW FLUE GAS TREATMENT CONDENSING HEAT EXCHANGER

BACKGROUND OF THE INVENTION

1. Field of the Invention

The present invention relates, in general, to the removal of contaminants from flue gas, and, in particular, to a new and useful method to recover useful heat while removing particulates (fly ash), sulfur oxides and/or other contaminants contained in flue gases formed during the combustion of waste materials, coal and other fossil fuels, which are burned by electric power generating plants, waste-to-energy plants and other industrial processes through the use of a two-stage downflow flue gas treatment condensing heat exchanger.

2. Description of the Related Art

In the power generating field, there are several known devices and methods which relate to the integrated heat recovery and pollutant removal of particulates, sulfur oxides and/or contaminants from a hot combustion exhaust gas for complying with federal and state emissions requirements.

One device which has been used is a condensing heat exchanger, as shown in FIG. 1, which recovers both sensible and latent heat from flue gas 11 in a single unit 10. The device allows for the gas 11 to pass down through a heat exchanger 12 while water 14 passes upward in a serpentine path through the tubes of heat exchanger 12. Condensation occurs within the heat exchanger 12 as the gas temperature at the tube surface is brought below the dew point. The condensate falls as a constant rain over the tube array of heat exchanger 12 and is removed at the bottom by condensate drain 16. Gas cleaning may occur within the heat exchanger 12 as the particulates impact the tubes and gas condensation occurs.

The heat exchanger tubes and inside surfaces of the heat exchanger shell are made of corrosion resistant material or are covered with Teflon® in order to protect them from corrosion when the flue gas temperature is brought below the acid dew point. Interconnections between the heat exchanger tubes are made outside of the tube sheet and are not exposed to the corrosive flue gas stream 11.

Another device used in this area is an integrated flue gas treatment (IFGT) condensing heat exchanger 20, schematically shown in FIG. 2, which is a condensing heat exchanger designed to enhance the removal of pollutants from flue gas stream 22. It is also made of corrosion resistant material or has all of the inside surfaces covered by Teflon. There are four major sections of the IFGT 20: a first heat exchanger stage 24, an interstage transition region 26, a second heat exchanger stage 28, and a mist eliminator 30. The major differences between the integrated flue gas treatment design of FIG. 2 and the conventional condensing heat exchanger design of FIG. 1 are:

1. the integrated flue gas treatment design uses two heat exchanger stages 24 and 28 instead of one heat exchanger 12 (FIG. 1);
2. the interstage or transition region 26, located between heat exchanger stages 24 and 28, is used to direct the gas 22 to the second heat exchanger stage 28, and acts as a collection tank and allows for treatment of the gas 22 between the stages 24 and 28;
3. the gas flow in the second heat exchanger stage 28 is upward, rather than downward;
4. gas outlet 29 of the second heat exchanger stage is equipped with an alkali reagent spray system, generally designated 40, comprising reagent source 42 with a pump 44 for pumping reagent 42, recirculated condensate, and spent reagent to sprayers 46 and 48; and
5. the mist eliminator 30 is used to separate the water formed by condensation and sprays from the flue gas.

Most of the sensible heat is removed from the gas 22 in the first heat exchanger stage 24 of the IFGT 20. The transition region 26 can be equipped with a water or alkali spray system 48. The system 20 saturates the flue gas 22 with moisture before it enters the second heat exchanger stage 28 and also assists in removing sulfur pollutants from the gas 22.

The transition piece 26 is made of or lined with corrosion resistant fiberglass-reinforced plastic or other corrosion resistant material. Additionally, the second heat exchanger stage 28 is operated in the condensing mode, removing latent heat from the gas 22 along with pollutants. Also, the top of the second heat exchanger stage 28 is equipped with an alkali solution or slurry spray device 46. The gas 22 in this stage 28 is flowing upward while the droplets in the gas 22 fall downward. This counter-current gas/droplet flow provides a scrubbing mechanism that enhances particulate and pollutant capture. The condensed gases, particulates, and reacted alkali solution are collected at the bottom of the transition section 26. The flue gas outlet 29 of the IFGT 20 is equipped with the mist eliminator 30 to reduce the chance of moisture carryover.

SUMMARY OF THE INVENTION

The present invention is a two-stage downflow flue gas treatment condensing heat exchanger system which utilizes a housing having an inlet at an upper end and a outlet at its lower end. Flue gas enters the housing at the inlet and travels downwardly through the housing and exits the housing at its lower end through the outlet. The housing has an upper stage beneath the inlet which contains a first condensing heat exchanger which withdraws heat from the flue gas in order to cool the flue gas as the flue gas is channeled downwardly through the housing. A second stage located directly beneath the first stage contains a second condensing heat exchanger which provides a further cooling of the flue gas by withdrawing more heat from the flue gas as the flue gas passes downwardly through the second stage toward the outlet. A collection tank located at the lower end of the housing beneath the second heat exchanger collects condensate, liquid, particulate and reaction product.

A mist eliminator is located at the lower end of the housing beneath the collection tank for demisting the flue gas prior to its exit through the outlet. A reagent spray system is located at the second stage for spraying the flue gas with an alkaline reagent solution or slurry for removing contaminants such as $SO_2$ from the flue gas. A spray wash system is located at the upper end of the housing for spraying cleaning liquid down the housing for cleaning both heat exchanger stages.

It is an object of the present invention to provide a system and method for treating a flue gas which utilizes two separate stages in a vertical relationship which channels the flue gas in a downward direction only.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
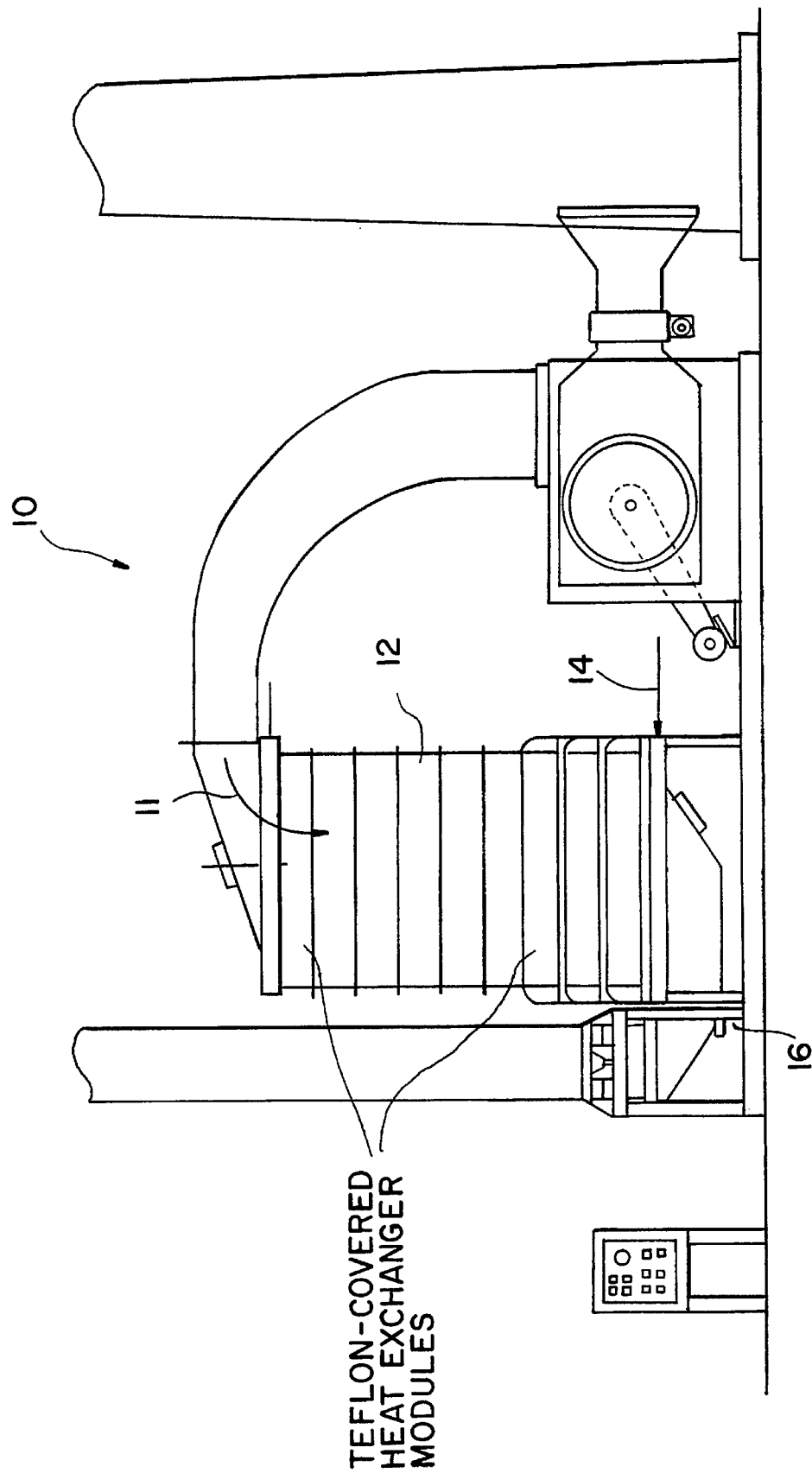
FIG. 1 is a schematic view illustrating a known condensing heat exchanger system.
Figure 2:
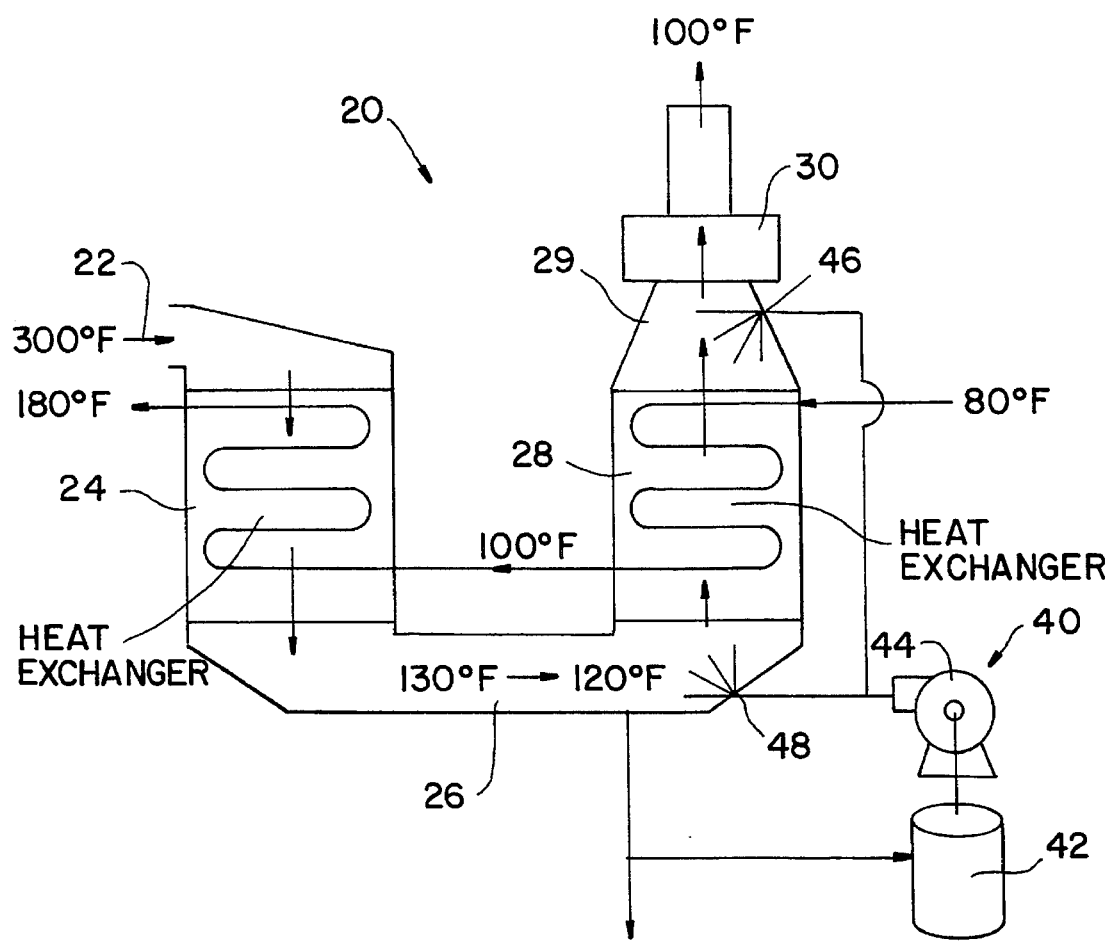
FIG. 2 is a schematic view illustrating an integrated flue gas treatment system.
Figure 3:
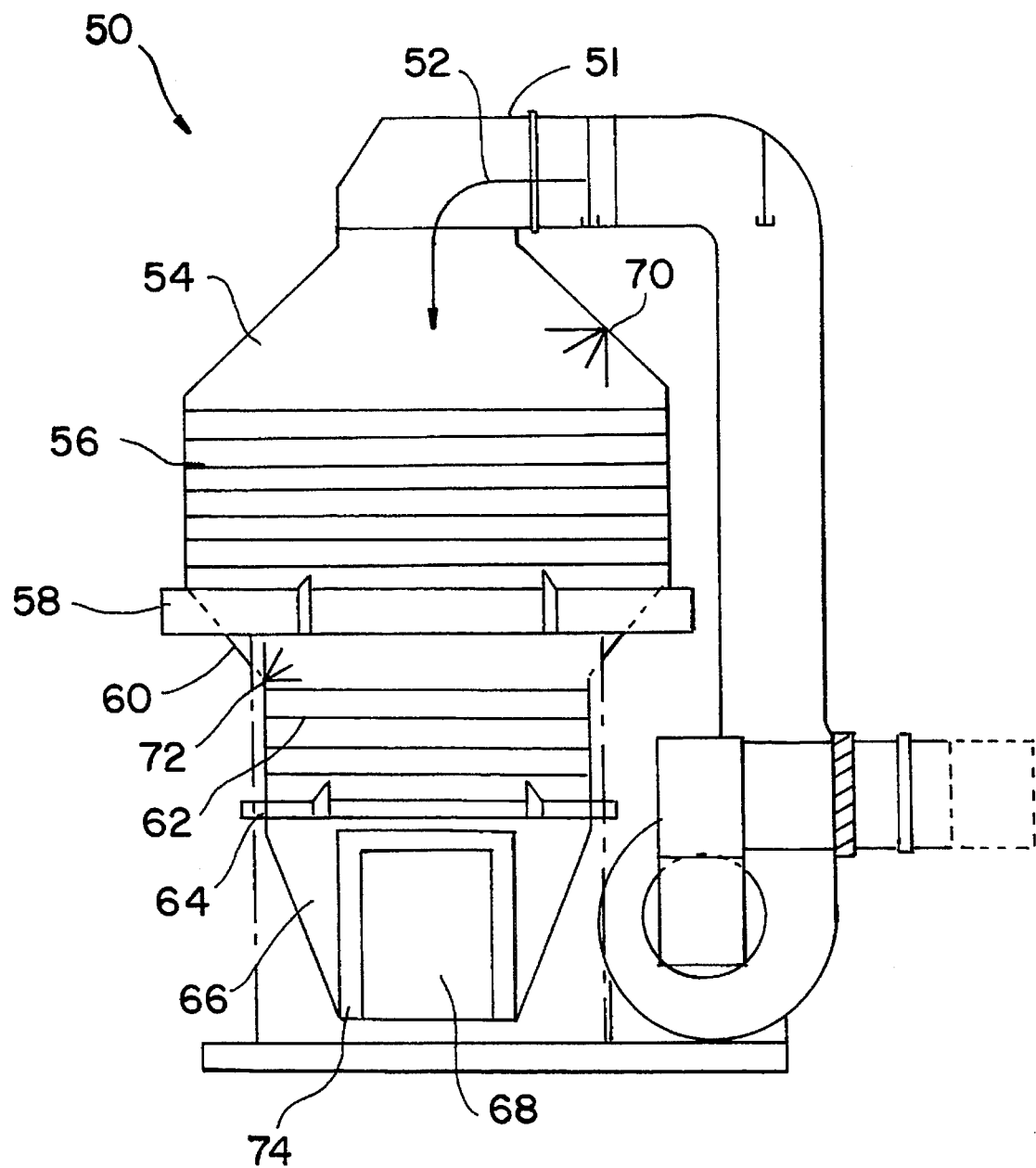
FIG. 3 is a schematic view illustrating a two-stage downflow flue gas treatment system according to the present invention.

The present invention is a two-stage downflow flue gas treatment condensing heat exchanger system and method using co-current gas/droplet flow, as shown in FIG. 3. The purpose of the present invention is to provide improved heat recovery and pollutant removal performance compared to the IFGT system shown in FIG. 2.

A preferred embodiment of the present invention, as best illustrated in FIG. 3, is a two-stage device, generally designated 50 having two condensing heat exchanger stages 56 and 62 mounted vertically in series in which flue gas 52 enters at the top of the device 50 through inlet 51 and exits at the bottom of the unit 50 through outlet 68. A transition section 60 separates the two heat exchanger sections 56 and 62. Transition section 54 communicates between inlet 51 and first heat exchanger 56. Structure 58 is used to support the first heat exchanger 56. Structure 64 supports the second heat exchanger 62.

Most of the sensible heat is removed from the flue gas 52 in the first heat exchanger stage 56 and after being passed through the transition section 60, the flue gas 52 enters the second or lower heat exchanger stage 62 where latent heat is removed. Droplets are formed in both stages due to condensation. The droplets fall downward due to the combined effects of gravity and the downward travel direction of the flue gas flow 52. The second heat exchanger stage 62 can be smaller than the first stage 56 in order to maintain the optimum velocity around the tubes for the cooler gas.

A collection tank 66 is provided near the bottom of the second stage 62 to collect the water droplets, condensed gases, particulates, reaction products, and alkali reagent. Additional collection mechanisms can also be added in the region of the collection tank 66 to aid in the removal of particulates and pollutants from the flue gas stream 52.

The top of the second stage 62 is optionally equipped with an alkali reagent spray system 72 to provide enhanced removal of sulfur oxides and other pollutants from gas 52. The gas 52 leaves the second heat exchanger stage 62 and passes through a mist eliminator 74 located in the region of outlet plenum 68. The liquid collected by the mist eliminator is fed back to the collection tank 66 through recycle or channeling means.

The two stage downflow flue gas treatment system 50 also includes a spray washing system 70 located at the top of the unit 50. Periodic washing of the heat exchanger tubes of heat exchangers 56 and 62 prevents potential plugging of the heat exchangers 56 and 62 and provides consistent thermal performance.

The major differences between the two-stage downflow flue gas treatment system 50 and the IFGT system 20 (FIG. 2) are:

1. The flue gas flows in the downward direction in the two-stage downflow flue gas treatment system 50 unlike the multi-directional flow of the IFGT system 20. In the IFGT system 20, the direction of gas flow in the second heat exchanger 28 is upward.

2. In the IFGT system 20, the direction of flow for the particulates and droplets collected in the second stage 28 is opposite to the direction of the flue gas flow. For the two-stage downflow system 50, the direction of flow in the heat exchangers is always the same for the flue gas, droplets, and particles, i.e. downward.

3. In the IFGT system 20, the particulates and droplets in the second stage 28 must be large enough to overcome the drag forces of the flue gas 22 before they reach the collection area 26. This is not a requirement for the two-stage downflow design according to the present invention.

4. In the IFGT system 20, the transition section 26 acts as the collection tank. The transition section 26 is located between the first and second heat exchanger stages 24 and 28, upstream from the coolest regions of the heat exchanger. The direction of flue gas flow in the second stage 28 is away from the collection region 26. For the two-stage downflow system 50 of the present invention, the collection tank 66 is downstream from the second heat exchanger stage 62. It is located downstream from the coolest regions of the heat exchanger 62 and the direction of the flue gas flow is toward the collection tank 66.

The two-stage downflow flue gas treatment system 50 is an improvement over the IFGT design 20. The advantages listed below compare the performance of the two-stage downflow flue gas treatment system 50 with a IFGT design 20.

The present invention has a smaller footprint than the standard IFGT condensing heat exchanger design, thus requiring less space for installation.

The present invention has a lower gas side pressure drop than comparable IFGT designs. The reason for this is that all of the flow is in the downward direction. The downflow (co-current droplet/gas flow) in the second heat exchanger stage 60 has a lower pressure drop than the gas upflow, droplet/particulate downflow condition (counter-current droplet/gas flow) encountered in the IFGT design. The lower pressure drop will permit a smaller forced or induced draft fan to be used in retrofit applications and result in lower parasitic losses during operation.

The present invention has superior heat recovery performance when compared to IFGT designs. Testing performed on the condensing heat exchangers 56 and 62 of the present invention has demonstrated that the gas downflow design provides maximum heat recovery performance. All of the heat recovered in the present invention is recovered under gas downflow conditions, while the second stage 28 of the IFGT design 20 recovers heat under gas upflow conditions.

The present invention also has improved particle removal performance, especially for very small particulates. The upflow direction of the flue gas stream 22 in the second stage 28 of a standard IFGT 20 carries particles away from the collection tank 26. In the standard IFGT design 20, very small particles will not be removed unless they become large enough (through water condensation, etc.) to overcome the drag forces of the gas stream and can fall back through the heat exchanger 28 to the collection tank 26. For the present invention, however, the downflow direction of the flow stream 52 always directs the particulates toward the collection tank 66.

The present invention has improved condensable gas removal performance. Condensable gases, such as heavy metals, and organic compounds, will form in very small droplets in the cooler regions of the heat exchanger. For the IFGT design 20, the coolest region of the heat exchanger 28 is downstream of the collection tank 26. For the same reasons as cited above, many of the condensable gas droplets formed in the IFGT design 20 will be carried out with the gas stream 22 and can only be collected in the mist eliminator 30. For the present invention, however, the downflow direction of the flow stream 52 always directs the droplets toward the collection tank 66. In this case, the mist eliminator 74 captures those droplets that are not removed at the collection tank 66.

The single water spray system 70 in the present invention cleans the whole area of both heat exchangers 56 and 62 since the cleaning water will flow through both heat exchangers 56 and 62. In the IFGT design 26, two separate spray cleaning systems are required to achieve the same result.

The loading on the mist eliminator 74 is less for the present invention because most of the mist will be removed in the collection tank 66. The small mist droplets will have a greater opportunity to form into larger droplets in the two-stage downflow design 50; and the momentum forces imparted to the droplets by the flue gas 52 is in the direction of the collection tank 66. For the IFGT design 20, most of the mist leaving the heat exchanger 28 will reach the mist eliminator 30; and when collected, must form droplets of sufficient size to be removed from the gas stream 22 and drained to the collection tank 26.

Although not illustrated, the present invention may incorporate other features which were not described above. The present invention may also include a third heat exchanger stage which could be added downstream of the second stage to improve the removal of condensing organics, heavy metals, and other condensible air pollutants from the flue gas. The third stage would operate independent of the rest of the system and would not be used for heat recovery. The third stage would have a closed cycle refrigerant loop, similar to a dehumidifier, for the purpose of lowering the flue gas temperature further to remove the condensible pollutants.

Also, the present invention can be tailored to incorporate multiple stages, rather than just the two stages described above. Each stage would be designed to optimize the removal of a particular pollutant of concern and would pretreat the flue gas for the next stage.

An additional transition section can also be added between the outlet of the second stage and the mist eliminators to coalesce droplets and particulates and/or impart momentum to the droplets and particulates in order to increase separation performance before the exhaust gas enters the mist eliminators.

The present invention can be used to pre-treat a flue gas prior to entering a wet scrubber. Advantages of this use include: lowering the inlet flue gas temperature which will allow the wet scrubber to operate more efficiently for $SO_2$ removal; the two stage downflow unit can be used to subcool the flue gas to maximize removal of particulates, HF, HCl, and condensable air toxics while the wet scrubber is used for $SO_2$ removal; a limestone based wet scrubber would produce high quality gypsum without the need for additional washing if the two stage downflow unit removed undesirable materials, such as chloride ions and inert particulates, during pretreatment of the flue gas; and there would be less reagent lost in a sodium regenerable process if the two-stage downflow unit removed HF, $SO_3$, $NO_2$, and HCl during pretreatment of the flue gas. This application would also reduce or eliminate the need for a purge to remove inert materials from the process.

While specific embodiments of the invention have been shown and described in detail to illustrate the application of the principles of the invention, it will be understood that the invention may be embodied otherwise without departing from such principles.

We claim:

1. A two stage downflow flue gas treatment system for treating a flue gas, comprising:

a housing having an inlet in an upper end and an outlet in a lower end, the flue gas entering the inlet and traveling downwardly through the housing and exiting through the outlet, the housing having a first portion which is larger than a second portion, the first portion being adjacent the upper end of the housing and the second portion being adjacent the lower end of the housing;

first tubular heat exchanger means positioned in the first portion of the housing for cooling the flue gas, the first tubular heat exchanger means including corrosion resistant tubes positioned horizontally in the housing;

second tubular heat exchanger means positioned in the housing beneath the first tubular heat exchanger means for further cooling the flue gas, the first and second tubular heat exchanger means being mounted vertically in series in the housing, the second tubular heat exchanger means including corrosion resistant tubes positioned horizontally in the housing, the second tubular heat exchanger means being smaller than the first tubular heat exchanger means;

alkali reagent spray means positioned above the second tubular heat exchanger means for cleaning pollutants from the flue gas;

spray wash means located above the first tubular heat exchanger means for washing the first and second tubular heat exchanger means; and collection means in the lower end of the housing below the second tubular heat exchanger means for collecting liquids and particulate.

2. The system according to claim 1, including mist elimination means for removing mist from the flue gas located prior to the outlet of the housing.

3. The system according to claim 1, including a transition section between the first tubular heat exchanger means and the second tubular heat exchanger means.

4. The system according to claim 1, including a structure for supporting the first tubular heat exchanger means in the housing.

5. The system according to claim 1, including a structure for supporting the second tubular heat exchanger means in the housing.

6. The system according to claim 1, wherein the spray wash means is means for periodically washing the first and second tubular heat exchanger means.

* * * * *